United States Patent Office 3,615,097
Patented Oct. 26, 1971

3,615,097
SEAL ASSEMBLY
Sven-Erik Malmstrom, Fabriksgatan, Sweden, assignor to Forsheda Gummifabrik Aktiebolag, Forsheda, Sweden
Filed Feb. 3, 1969, Ser. No. 796,125
Claims priority, application Sweden, Feb. 2, 1968, 1,379/68
Int. Cl. F16j 15/32
U.S. Cl. 277—95
8 Claims

ABSTRACT OF THE DISCLOSURE

Seal between two chambers in which two different pressures prevail and which is separated by wall through which a shaft passes, comprising a body ring of rubber which is stretched round the shaft, thereby fixing in right position an integral annular lip which presses axially along an annular sealing surface against the side of the wall where the prevailing pressure is highest by means of the inherent tension of the lip and due to the influence of the ambient pressure characterized thereby that the free surface of lip facing the wall is little compared with the radial thickness of the body ring.

---

Figure 1:
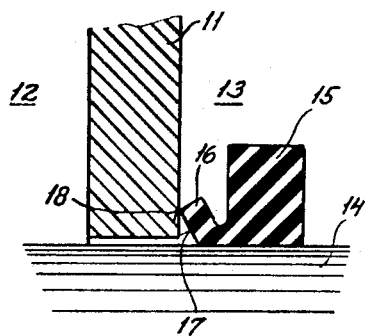

The present invention relates to a seal between two chambers in which two different pressures prevail and which is separated by a wall through which a shaft passes.

The seal comprises a body ring of rubber which is stretched round a shaft, thereby fixing in the right position an integral annular lip which presses axially along an annular sealing surface against the side of the wall where the prevailing pressure is highest by means of the inherent tension of the lip and due to the influence of the ambient pressure.

This type of seal described above which is represented by e.g. the so-called V-ring is under normal operating conditions less suitable as a pressure seal. A pressure will namely press the lip of the seal completely against the wall. This results in the area of sealing surface against which the seal rubs being the same as that of the inner surface of the seal facing the wall. The frictional force will be large and at high pressures (1 kg./cm.² and above) wear on the ring and the heat generated will be so high that the lip will be unuseable after a short time of operation.

The aim of the present invention is to eliminate these inconveniences. This is achieved by providing the free surface of the lip facing the wall little compared with the radial thickness of the body ring. In the following description and the attached drawing showing a number of representative forms of the invention it can be seen how the required effect is achieved. Each of the FIGS. 1–5 on the drawing show a section of each form of the invention.

A wall 11 separates two spaces 12 and 13. The pressure in space 13 is higher than the pressure in space 12. Shaft 14 penetrates through the wall 11. A supporting body 15 of rubber is stretched around the shaft 14. A conically formed lip 16 extends outwards from the inner surface of the supporting body 15. Due to the influence of the ambient pressure and the inherent tension in the lip, the lip 16 is pressed against the wall 11 and will lay against the wall along an annular sealing surface 18 with its inner slightly tapered surface 17. The supporting body of the ring 15 has a large mass and considerable radial extension compared with the lip in order to guarantee a stable position of the lip in relation to the wall 11. The task of the supporting body of the ring is also to guarantee sealing between the body and the shaft. The lip however, is so robust that it will not be easily deformed and deflected due to the influence of the pressure against the sealing surface. The purpose of the invention is to achieve a pressure seal with high effectivity. By this is meant capability of tolerating high pressure at high peripheral speed and with a minimum of wear which in turn implies maximum life. By forming the lip as shown in FIG. 1 i.e. the lip which is essential quadratic in section so that its form will remain more or less unaltered it will press against the sealing surface with a somewhat sharp edge. However a certain deformation is inevitable due to the fact that the sealing surface of the lip will be subjected to a certain radial extension. According to the invention this extension will be small in relation to that of the supporting body and must be moreover a little as possible. The advantage of this can be seen from the following Frictional losses and the heat generated at the sealing position for a rubber seal are proportional to the area of the sealing surface. The specific surface pressure coefficient of friction and the sliding speed. Since the specific surface pressure coefficient of friction and sliding speed can be considered as being relatively constant the size of the sealing surface is that which becomes of most significant importance. The smaller the sealing surface the less the friction heat generated and wear, and the higher the duration of the seal.

A seal in nitrile rubber designed in FIG. 1 operates satisfactorily if the following conditions are fulfilled:

Shaft diameter: 50 mm.
Rotational speed: 2000 r.p.m.
Pressure: 2 kg./cm.²

The temperature at the sealing surface is under 70° C. and the temperature of one liter oil which surrounds the sealing location is 50–60° C. in durable stage. This means that such a simple seal can operate under conditions which have previously required a sealing arrangement, considerably more complicated.

Figure 2:
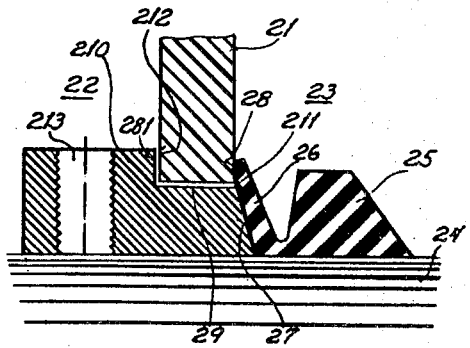

Essentially the same results can be obtained with a seal in accordance with FIG. 2. The sealing rubber element is of the type which is accepted under the commercial name V-ring. The supporting body of the ring 25 fixes the lip 26 on a shaft 24 which passes through a hole 21. Two chambers 22 and 23 are separated by the wall 21. A higher pressure prevails in chamber 23. The hole 29 through which the shaft passes is considerably larger than the shaft. A sleeve 210 is inserted in the space between the hole 29 and the shaft 24. The surface 211 at the end of the sleeve is tapered at such an angle that it constitutes a support for the lip which presses against the sleeve over the major part of its surface 27.

Due to the prevailing pressure in space 23 the lip of the ring is pressed against a tapered surface 211 of the sleeve and only the outer part of the lip presses against the wall 21 along a sealing surface 28 which is very narrow in relation to the body of the ring and the lip.

A sealing arrangement in FIG. 2 is advantageous from a number of points of view. A standard product, V-ring, constitutes a vital part of the seal. A sleeve can be manufactured from a large quantity of different materials from metal to plastic and rubber. The most essential advantage is however that the application does not demand any close tolerances.

A discrepancy in thickness of the wall 21 of 0.1 mm. can be permitted without any inconvenience. This applies even to the section of the sleeve which is embraced by the wall 21. A sleeve 210 is mounted with narrow clearance between the surface 211 and the surface 281 which is situated on the opposite side of the sealing surface 28. The sleeve is locked in positioned by a locking screw 213. The V-ring is projected forward so that its lip comes in contact with the entire surface 211 on the sleeve 210.

Thereby the correct sealing position for the outer section of the lip is automatically obtained. No mechanical operation on the shaft in the form of supporting edges for the V-ring is necessary in this design. The inherent tension in the body of the ring 25 around the shaft is sufficient to fix the V-ring in position relative to the sleeve and at the same time comprises a perfect seal round the shaft. The position of the sleeve is determined on mounting relative to the wall 21. A further advantage with a device in accordance with FIG. 2 is the following. If the V-ring should need changing for some reason the locking screw 213 can be released and the sleeve 210 can be moved backwards to such an extent that the V-ring can be drawn out through the space between the shaft 24 and the hole 29 and removed. A new V-ring can now be stretched over the shaft and pressed through the hole in the wall 21 after which the sleeve is pressed into position and locked by means of locking screw 213.

Figure 3:
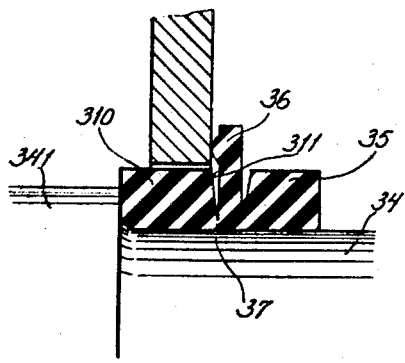

FIG. 3 shows a further development of the basic invention as shown in FIGS. 1 and 2. Here the sleeve 210 (see FIG. 2) is replaced by a rubber ring 310, the supporting surface 311 of which for the lip 36 is combined with the rubber ring 310 by means of its inner section 37. The rubber ring is stretched round the shaft 34. The retaining force which the rubber ring obtains due to its inherent intention is sufficient to retain the seal in position at a considerable pressure. Whilst the sleeve 210 is positively fixed with the aid of the locking screw 213 the rubber ring 310 is held in position due to the friction between the shaft and the rubber ring. This means that a certain amount of precaution must be observed in applications according to FIG. 3 which are subjected to high pressure.

It is therefore convenient to provide the rubber ring with a support against a shoulder 341 on the shaft 34 in order to eliminate all risks.

Figure 4:
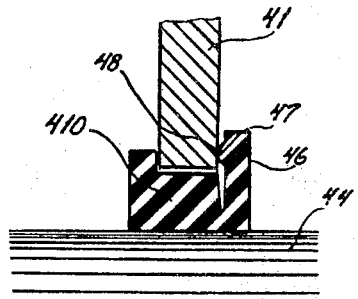

In the seal according to FIG. 4 the supporting body 35 (see FIG. 3) is omitted and the rubber ring 410 which serves as a supporting sleeve for the lip 46 in this design also takes the part of the clamping ring to which the lip 46 is attached.

The lip is provided with an annular formed ridge 47 which presses against the wall 41 along a sealing surface 48. The task of the ridge is to permit a certain axial displacement between the shaft 44 and the wall 41 without jeopardizing the effectively of the seal.

Figure 5:
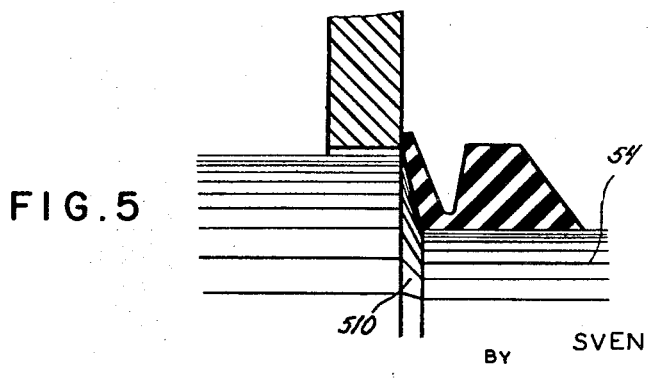

FIG. 5 shows a variant of the design according to FIG. 2. The difference between these two is that the sleeve 210 is replaced by a shoulder 510 on the shaft 54.

The sleeve 210, rubber rings 310 and 410 and shoulder 510 of the seal arrangement described above serve as a collar means, each having a tapered axial end face toward which the lip normally flexes.

I claim:

1. A seal between at least two chambers which are separated by a wall having an opening through which a shaft member extends comprising an annular flexible lip made of a resilient material mounted on the shaft and disposed angularly to the wall, said lip having an annular peripheral portion of small area in sliding contact with one face of the wall, collar means having an annular tapered axial end face, said lip normally flexing in a direction toward said end face of said collar means, said collar means adapted to be disposed relative to said wall so that only the peripheral portion of the lip is in sliding contact with one face of the wall.

2. A seal in accordance with claim 1 wherein said collar means consists of a sleeve mounted on the shaft and wherein said axial end face provides an abutment surface for the lip disposed so that the major portion of the lip is in non-sliding contact with said abutment surface and the outer peripheral portion of the lip is in sliding contact with one face of the wall.

3. A seal in accordance with claim 2 including an annular body portion made of a resilient material mounted on the shaft in a manner to fix the body portion against axial displacement, said lip projecting angularly from one axial end of said body portion.

4. A seal in accordance with claim 3 wherein said body portion and lip are made of rubber.

5. A seal in accordance with claim 1 wherein said collar means consists of a tapered shoulder on the shaft disposed angularly relative to the wall and providing an abutment surface against which the major portion of the lip is in non-sliding contact.

6. A seal in accordance with claim 1 wherein said collar means is in the form of a sleeve made of a flexible resilient material and said lip formed integrally therewith at said axial end face thereof.

7. A seal in accordance with claim 1 including a body portion made of a resilient material and wherein said collar means comprises a sleeve made of flexible resilient material and wherein said lip is formed integrally with said sleeve and body portion, said lip being disposed between said sleeve and body portion and normally flexed in a direction toward the axial end face of said sleeve.

8. A seal in accordance with claim 7 wherein the shaft is provided with a shoulder against which the opposite end face of the sleeve abuts.

References Cited

UNITED STATES PATENTS

| 2,013,499 | 9/1935 | Meckenstock | 277—95 |
| 2,733,567 | 2/1956 | Zellweger | 277—95 X |
| 3,016,251 | 1/1962 | Gilbert | 277—95 |
| 3,279,803 | 10/1966 | Sekulich | 277—95 X |

FOREIGN PATENTS

| 1,286,775 | 1/1962 | France | 277—208 |

ROBERT I. SMITH, Primary Examiner